United States Patent Office 3,723,341
Patented Mar. 27, 1973

3,723,341
ALKALI-HALOGENATED SOLVENT
EMULSION SYSTEM
Maurice A. Raymond, Northford, and Michael Scardera, Hamden, Conn., assignors to Olin Corporation
No Drawing. Filed Feb. 12, 1971, Ser. No. 115,115
Int. Cl. B01j 13/00; C11d 7/06
U.S. Cl. 252—312    11 Claims

ABSTRACT OF THE DISCLOSURE

This invention relates to a stable alkali-halogenated solvent emulsion system using selected alkylphenol-glycidol adducts as surfactants.

This invention relates to novel stable emulsions of an aqueous alkali solution and selected halogenated solvents using selected alkylphenol-glycidol adducts as surfactants to effect such emulsion.

The stable alkali-halogenated solvent emulsion systems of this invention are particularly advantageous because such systems while being basic are soluble in both organic or inorganic media and thus can be used in a wide variety of applications, such as the solvent processing of textiles, caustic cleaning, hard surface cleaning, e.g. glass and metal, drain cleaning and wool scouring.

Stable emulsions of halogenated solvents and alkali or caustic solutions have not generally been available, primarily because of the difficulties in forming and maintaining such emulsions. Cationic surfactants, such as cetyl trimethyl ammonium chloride have been found to react with caustic and are degraded. Anionic surfactants, will in general, oil out of a strongly caustic solution, or as in the case of the phosphate surfactants, they may be decomposed by the caustic. Nonionic surfactants are generally incompatible with strong caustic solutions.

Now it has been found that stable emulsions of an aqueous alkali phase and an organic phase containing a halogenated solvent can be formed by using selected alkylphenol-glycidol surfactants as emulsifiers.

The alkylphenol-glycidol adducts which are useful as surfactants in the emulsion system of this invention generally have the following formula:

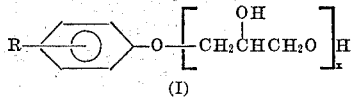

(I)

wherein R may be any alkyl group and more particularly, an alkyl group having 8 to 12 carbon atoms, e.g. octyl, nonyl, and dodecyl and $x$ is from about 1 to about 15 and preferably from about 2 to about 12. It is noted that the $x$ number represents an average number of units per alkylphenol unit. Surfactants of the above type (I) are commercially available and may be prepared by well-known methods as illustrated for example in U.S. Pats. 2,213,477 and 2,233,281.

The organic phase found in the emulsion system of this invention contains a halogenated organic solvent. Any of the well-known halogen containing organic solvents, i.e. chlorine, bromine, iodine and fluorine may be used as illustrated for example in "Organic Solvents," by Weissberger et al., 1955. More particularly, the halogenated organic solvents used in the emulsion system of this invention are generally chlorine and bromine substituted aliphatic hydrocarbons having up to 6 carbon atoms and up to 4 chlorine and bromine atoms. Preferably, the halogenated aliphatic hydrocarbons will have up to 4 carbon atoms. Illustrative of such halogenated organic solvents are the following: dichloromethane; ethyl chloride; 1,1-dichloroethane; 1,2-dichloroethane; 1,2-dichloroethylene; 1,2 - dichloropropane; 1,1,1 - trichloroethane; 1,1,2 - trichloroethane; trichloroethylene; trichloromethane; carbon tetrachloride; 1,1,2,2 - tetrachloroethylene; isobutyl chloride; 1-chloropentane; ethyl bromide; propyl bromide; hexyl bromide; dibromoethane; dibromobutane and tetrabromoethane.

The aqueous alkali or caustic phase of the emulsion system of this invention generally can contain a wide variety of inorganic metal salts or hydroxides and mixtures thereof with the particular compound selected depending on the ultimate use intended. More particularly the aqueous alkali phase will contain an alkali metal hydroxide or an alkali metal salt selected from the group consisting of carbonates, phosphates and silicates. The term "alkali metal" is intended to include those metals normally considered as part of the alkali metal group, i.e. sodium, potassium, lithium, cesium, etc. Preferably, the alkali metal used will be sodium or potassium. Illustrative of such alkali compounds are the following: sodium hydroxide, potassium hydroxide, sodium carbonate, potassium carbonate, sodium phosphate ($Na_3PO_4 \cdot H_2O$), potassium phosphate and sodium silicate.

In the emulsion system of this invention, the alkylphenol-glycidol surfactant can generally be used in an amount of from about 0.01 to about 15% by weight and preferably from about 1 to about 10% by weight based on the total weight of the aqueous alkali and halogenated organic solvent phases.

The proportion of alkali aqueous phase to halogenated solvent phase can vary between about 10:1 to about 1:10 on a weight basis with the preferred range being about 1:1.5 to about 1.5:1. The concentration of the alkali solution can vary widely up to about 50% of the alkali compound in aqueous solution with the preferred concentration varying depending upon the particular solvent selected.

The following examples are further illustrative of this invention.

EXAMPLE 1

Twenty-five (25) grams of 30 percent sodium hydroxide solution and five (5) grams of nonylphenol-glycidol surfactant having the formula:

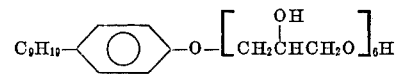

were weighed into a four-ounce bottle. It is noted that the surfactant noted above shows the nonyl group in the para position. This is done for convenience and in actuality the surfactant being used is a mixture of isomers with the larger portion (>90%) being para and most of the remainder being ortho. The caustic solution was warmed slightly (about 35 to 40° C.) to facilitate the dissolving of the surfactant and then the solution was cooled to room temperature. Twenty-five (25) grams of dichloromethane were then added to the solution, the bottle capped and hand shaken. A clear emulsion was formed and remained stable at room temperature, as noted by visual observation, for more than 48 hours.

EXAMPLES 2 TO 33

Using similar techniques as in Example 1, additional emulsions were prepared with the resulting data shown in Table 1. In all examples a 1:1 weight ratio of alkali solution to halogenated solvent was used (25 grams of each) and the weight of surfactant used was 5% (2.5 grams) based on the total weight of alkali solution plus organic solvent. It is noted that in the table the reference to the surfactant emulsifier of I is used to indicate a surfactant having a formula as indicated in Col. 1.

TABLE I.—EMULSIFICATION OF A 1:1 WEIGHT RATIO OF ALKALI SOLUTION:HALOGENATED SOLVENTS WITH GLYCIDOL SURFACTANTS

| | Halogenated solvent | Alkali solution concentration, wt. percent | Emulsifier (wt. percent based on total of alkali/organic phases) | Emulsion stability time (hrs.) |
|---|---|---|---|---|
| 2 | Dichloromethane | NaOH (20) | 5% I (See Column No.—) with $x=6$ | 2. |
| 3 | do | NaOH (20) | 10% I with $x=6$ | 3. |
| 4 | do | NaOH (20) | 10% I with $x=10$ | 3. |
| 5 | do | NaOH (20) | 5% I with $x=6/x=10$ (50/50 mixture) | 2. |
| 6 | do | NaOH (30) | 5% I with $x=6$ | 6. |
| 7 | do | NaOH (30) | 5% I with $x=10$ | 3. |
| 8 | 1,2-dichloroethane | NaOH (20) | 5% I with $x=6$ | 6. |
| 9 | do | NaOH (20) | 1% I with $x=6$ | 6. |
| 10 | do | NaOH (20) | 10% I with $x=10$ | 3. |
| 11 | do | NaOH (20) | 5% I with $x=6/x=10$ (50/50 mixture) | 3. |
| 12 | 1,1-dichloroethane | NaOH (20) | 5% I with $x=3/x=10$ (50/50 mixture) | 24. |
| 13 | 1,2-dichloropropane | NaOH (20) | do | 3. |
| 14 | 1,2-dichloroethane | NaOH (23.5) | 5% I with $x=6$ | 96. |
| 15 | 1,2-dichloropropane | NaOH (14) | do | 96. |
| 16 | 1,1-dichloroethane | NaOH (15) | do | 2. |
| 17 | do | NaOH (15) | 5% I with $x=3/x=10$ (50/50 mixture) | 3. |
| 18 | Dichloromethane | Na₂CO₃ (4) | 5% I with $x=6$ | 5 mins. |
| 19 | do | KOH (30) | do | 1. |
| 20 | Dichloropropane | Na₂CO₃ (4) | do | 1. |
| 21 | do | KOH (30) | do | 1. |
| 22 | 1,1,2,2-tetrachloroethylene | Na₂CO₃ (4) | 5% I with $x=3/x=10$ (50/50 mixture) | 20 mins. |
| 23 | do | KOH (30) | do | 40 mins. |
| 24 | 1,1,1-trichloroethane | NaOH (20) | do | >5. |
| 25 | do | NaOH (30) | do | >24. |
| 26 | do | NaOH (40) | do | >48. |
| 27 | do | NaOH (30) | do | ~30 mins. |
| 28 | do | Na₃PO₄·H₂O (10.7) | do | ~10 mins. |
| 29 | do | Na₃PO₄·H₂O (5.3) | do | ~10 mins. |
| 30 | 1,1,2,2-tetrachloroethylene | NaOH (20) | do | >24. |
| 31 | do | NaOH (30) | do | >6. |
| 32 | do | NaOH (40) | do | >6. |
| 33 | do | NaOH (30) | do | ~10 mins. |

What is claimed is:

1. A stable emulsion system consisting essentially of:
   (a) an aqueous alkali phase containing an alkali metal hydroxide in an amount of up to 50% by weight or an alkali metal salt selected from the group consisting of alkali metal carbonates, phosphates and silicates;
   (b) an organic phase consisting essentially of a halogenated aliphatic hydrocarbon having up to 6 carbon atoms and
   (c) an alkylphenol-glycidol surfactant having the formula:

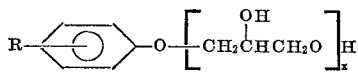

wherein R is an alkyl group having 8 to 12 carbons and $x$ is from about 1 to about 15, which represents the average number of glycidol units per alkylphenol unit said aqueous alkali phase and said organic phase being present in a weight ratio of about 1:10 to about 10:1 and said alkylphenol-glycidol surfactant is present in an amount from about 0.01 to about 15 percent by weight based on the total weight of the aqueous alkali and organic phases.

2. The stable emulsion system of claim 1 wherein the aqueous alkali phase contains an alkali metal hydroxide selected from the group consisting of sodium and potassium hydroxides.

3. The stable emulsion system of claim 1 wherein the organic phase consists essentially of a bromine or chlorine substituted aliphatic hydrocarbon having up to 4 carbon atoms and up to 4 chlorine or bromine atoms.

4. The stable emulsion system of claim 1 wherein the alkylphenol-glycidol surfactant is selected from the group consisting of octyl, nonyl and dodecylphenol-glycidol surfactants.

5. The stable emulsion system of claim 4 wherein the organic phase consists essentially of a bromine or chlorine substituted aliphatic hydrocarbon having up to 4 carbon atoms and up to 4 chlorine or bromine atoms.

6. The stable emulsion system of claim 11 wherein nonylphenol-glycidol surfactant is used.

7. The stable emulsion system of claim 6 wherein the nonylphenol-glycidol surfactant has an average of 6 glycidol units per nonylphenol unit.

8. The stable emulsion system of claim 6 wherein the nonylphenol-glycidol surfactant has an average of 10 glycidol units per nonylphenol unit.

9. The stable emulsion system of claim 6 wherein the nonylphenol-glycidol surfactant is a mixture of an adduct having 3 glycidol units per nonylphenol unit and an adduct having 10 glycidol units per nonylphenol unit.

10. The stable emulsion system of claim 2 wherein the organic phase consists essentially of bromine or chlorine substituted aliphatic hydrocarbon having up to 4 carbon atoms and up to 4 chlorine or bromine atoms.

11. The stable emulsion system of claim 10 wherein the alkylphenol-glycidol surfactant is selected from the group consisting of octyl, nonyl and dodecylphenol-glycidol surfactants.

References Cited

UNITED STATES PATENTS 3,060,126  10/1962  Gerard et al. _____ 252—159

JOHN D. WELSH, Primary Examiner

U.S. Cl. X.R.

8—139.1; 252—158, 364